Jan. 21, 1941.　　　　　L. M. SIGLER　　　　　2,229,349
MACHINE FOR OPENING EGGS AND SEPARATING THE CONTENTS THEREOF
Filed Jan. 26, 1938　　　　5 Sheets-Sheet 1

INVENTOR:
LAURENCE M. SIGLER
ATTORNEY.

INVENTOR:
LAURENCE M. SIGLER.
BY
ATTORNEY

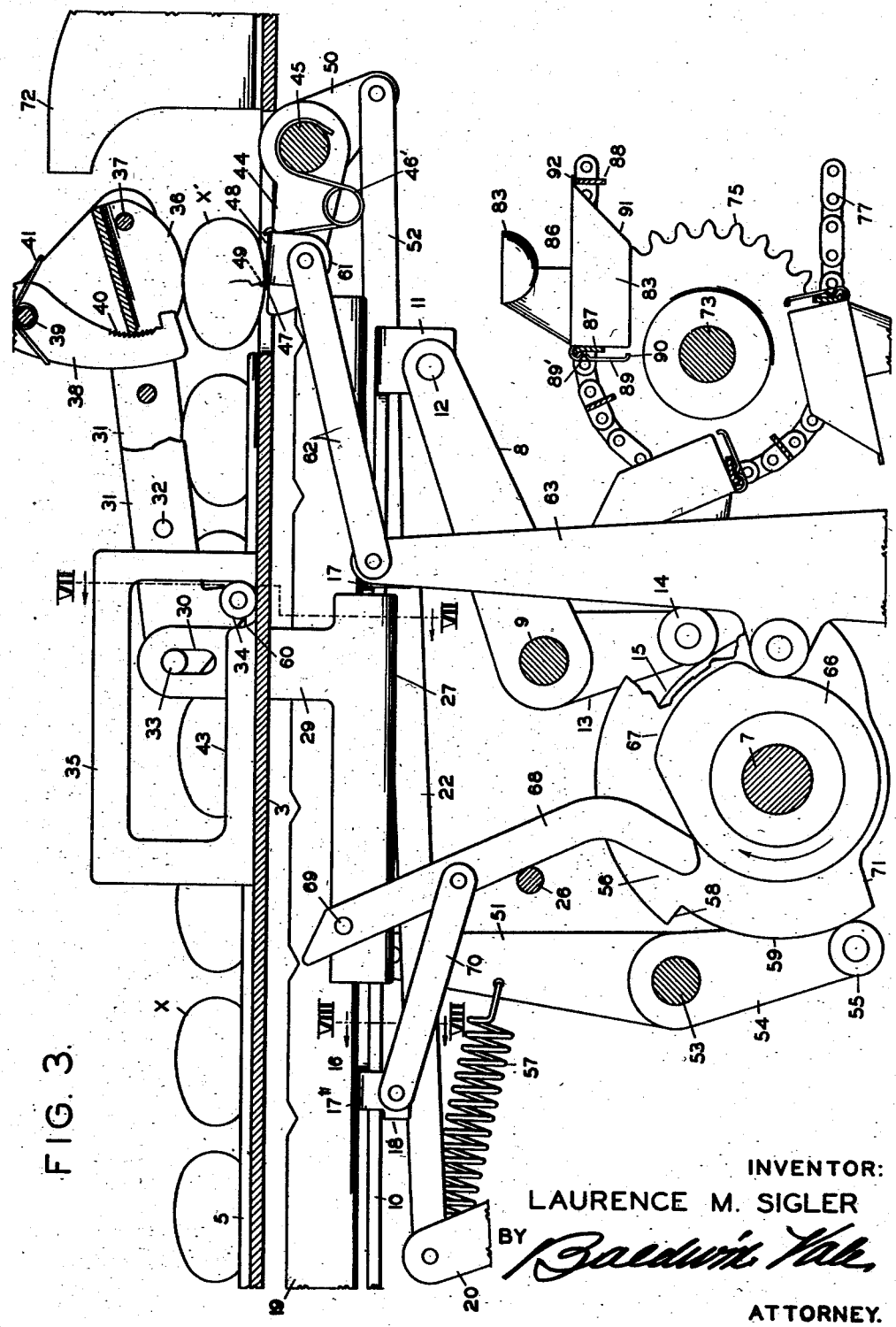

Jan. 21, 1941.    L. M. SIGLER    2,229,349
MACHINE FOR OPENING EGGS AND SEPARATING THE CONTENTS THEREOF
Filed Jan. 26, 1938    5 Sheets-Sheet 4
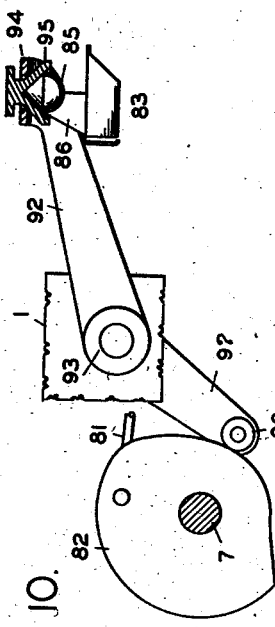
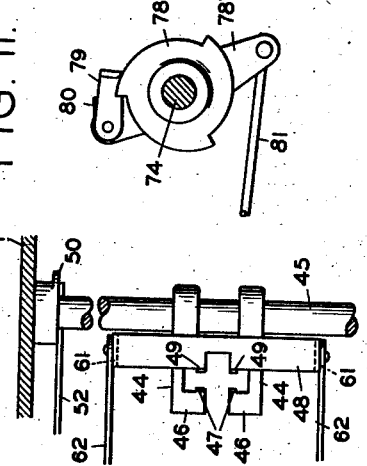
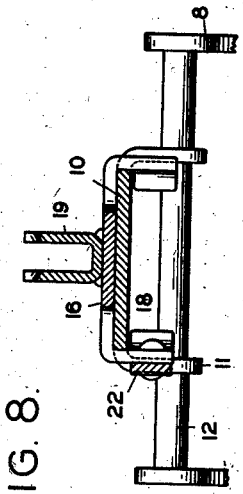
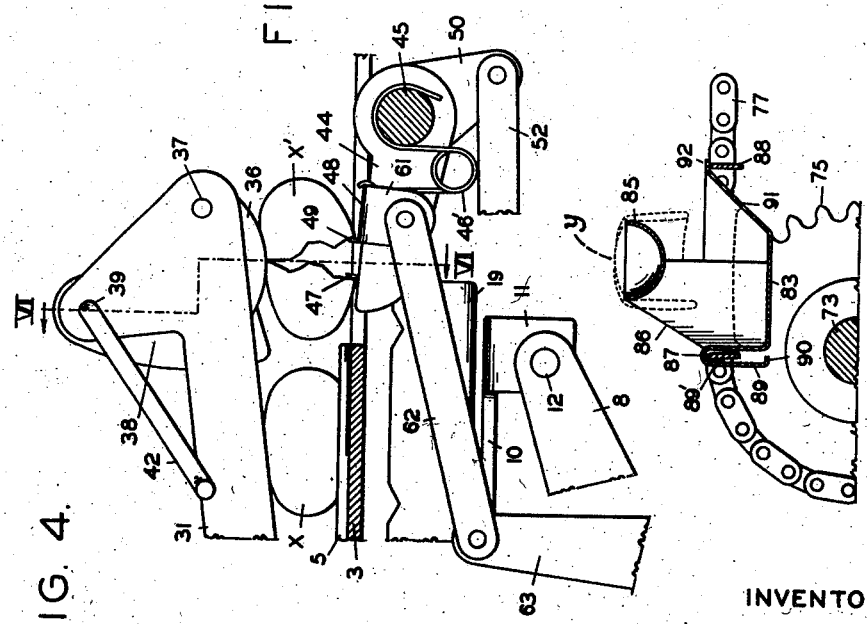
INVENTOR:
LAURENCE M. SIGLER
BY
ATTORNEY.

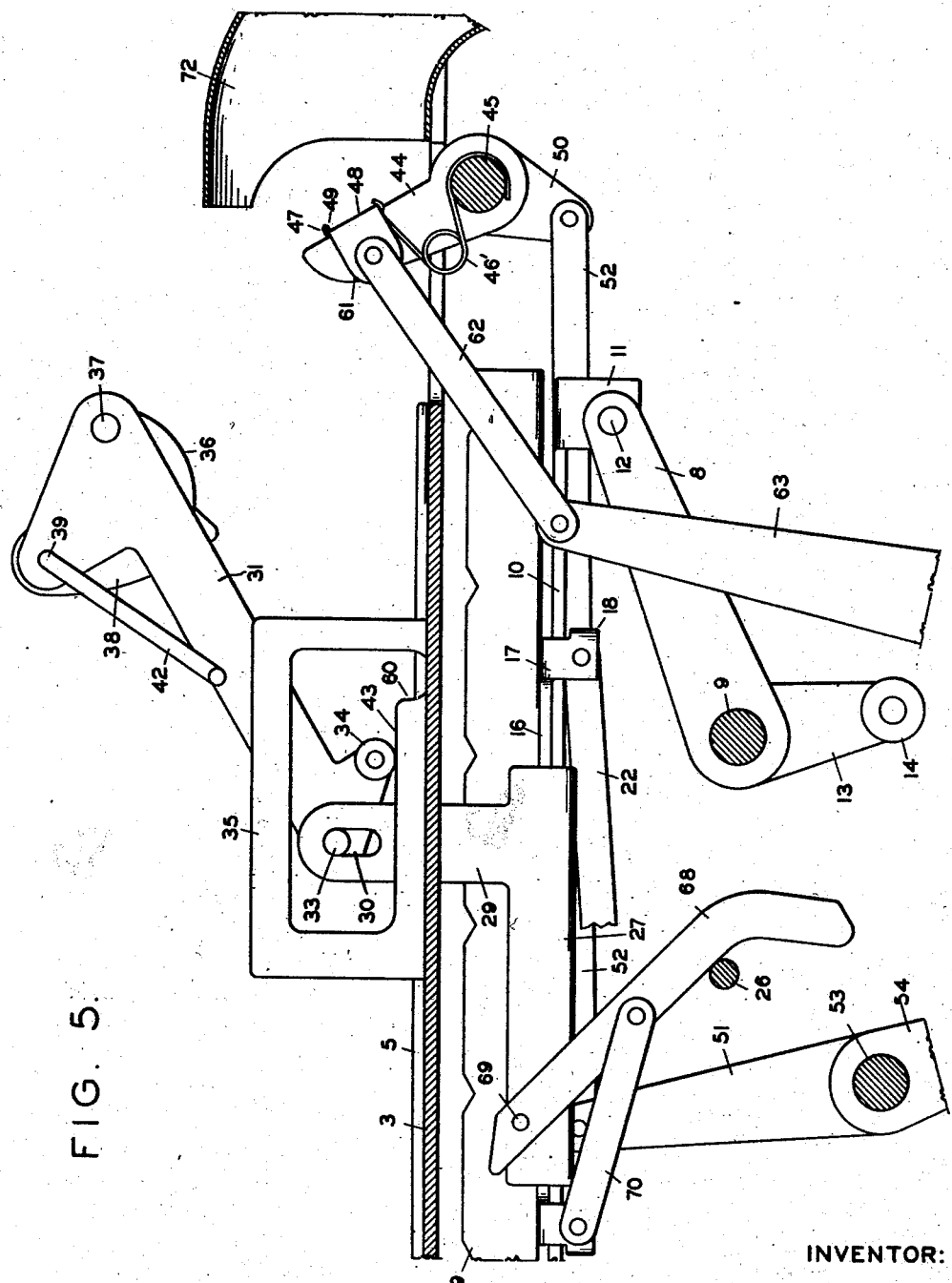

Patented Jan. 21, 1941

2,229,349

UNITED STATES PATENT OFFICE 2,229,349

MACHINE FOR OPENING EGGS AND SEPARATING THE CONTENTS THEREOF

Laurence M. Sigler, Wilmington, N. C., assignor of one-third to James C. Gill, San Francisco, Calif., and one-third to Kathryn B. Gill, San Francisco, Calif.

Application January 26, 1938, Serial No. 187,008

11 Claims. (Cl. 146—2)

This invention relates to improvements in machines for opening eggs and separating the contents thereof.

Among the objects of the present invention is to provide an inexpensive machine for the present purpose which is simple in construction and permanently reliable in operation.

Another object is to eliminate the breakage of yolks in the operation of separating the egg contents.

Another object is to obviate the necessity for high speed mechanisms for opening the eggs and separating the contents thereof.

Another object is to remove the residual egg white adhering to the yolks without rupturing the yolks.

Another object is to provide removable pans for the reception of the individual egg contents when the shell is opened so that any spoiled or musty eggs may be removed to prevent contamination of the accumulated separated whites and yolks.

Another object is to render the machine automatically self-adjustable to varying egg sizes, thus enabling the expeditious handling of ungraded eggs.

Other objects and advantages will appear as this description progresses.

In this specification and the accompanying drawings, the invention is illustrated in its preferred form. It is to be understood, however, that it is not limited to this form because it may be embodied in other forms within the purview of the claims following the description.

In the five sheets of drawings:

Fig. 3 is a similar view of the same enlarged and broken away in parts, showing the egg impaled on the opening prongs as the first step in the opening operation.

Fig. 4 is a similar view of the same showing the egg pried open and its contents dropped on to the separatory tray.

Fig. 5 is a similar view of the same showing the empty egg shell ejected.

Fig. 6 is a transverse vertical sectional view taken along the line VI—VI in Fig. 4 and showing the egg clamping means and opening prongs in operative positions.

Fig. 7 is a similar view taken along the line VII—VII in Fig. 3 and showing the means for feeding the eggs into the egg opening means and the mechanism for operating the self-adjusting egg clamping means.

Fig. 8 is a similar view of the egg feeding means taken along the line VIII—VIII in Fig. 3.

Fig. 9 is a fragmentary plan view drawn to reduced scale of the egg opening prongs shown in operative position.

Fig. 10 is a diagrammatic longitudinal vertical section of the means for severing the adhering egg white from the yolk in the separatory egg tray together with the mechanism for operating the same.

Fig. 11 is a similar view taken along the line XI—XI in Fig. 1 showing the means for driving the separatory tray conveyor.

Figure 1:
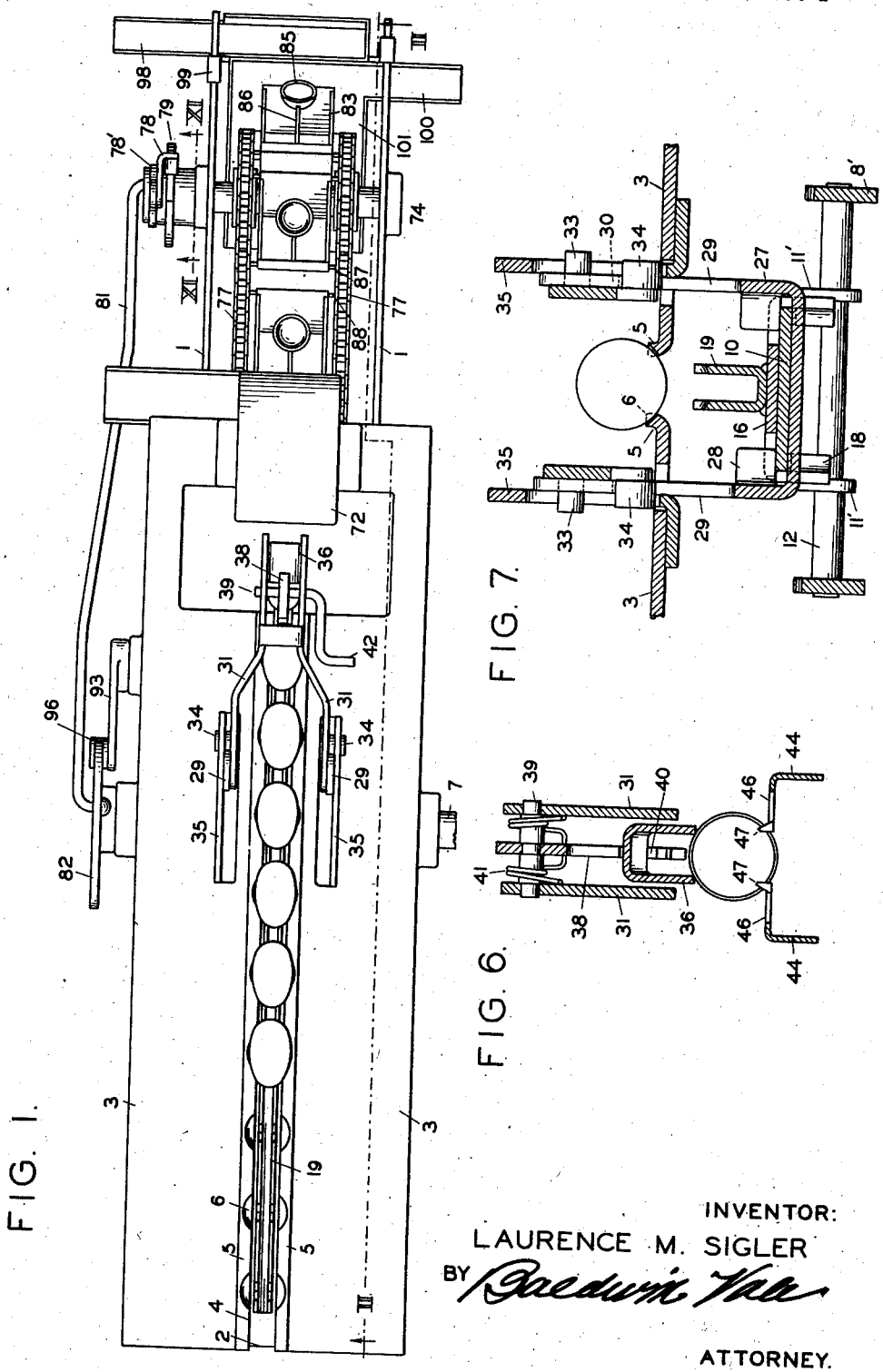
Fig. 1 is a plan view of an egg handling machine constructed in accordance with this invention.
Figure 2:
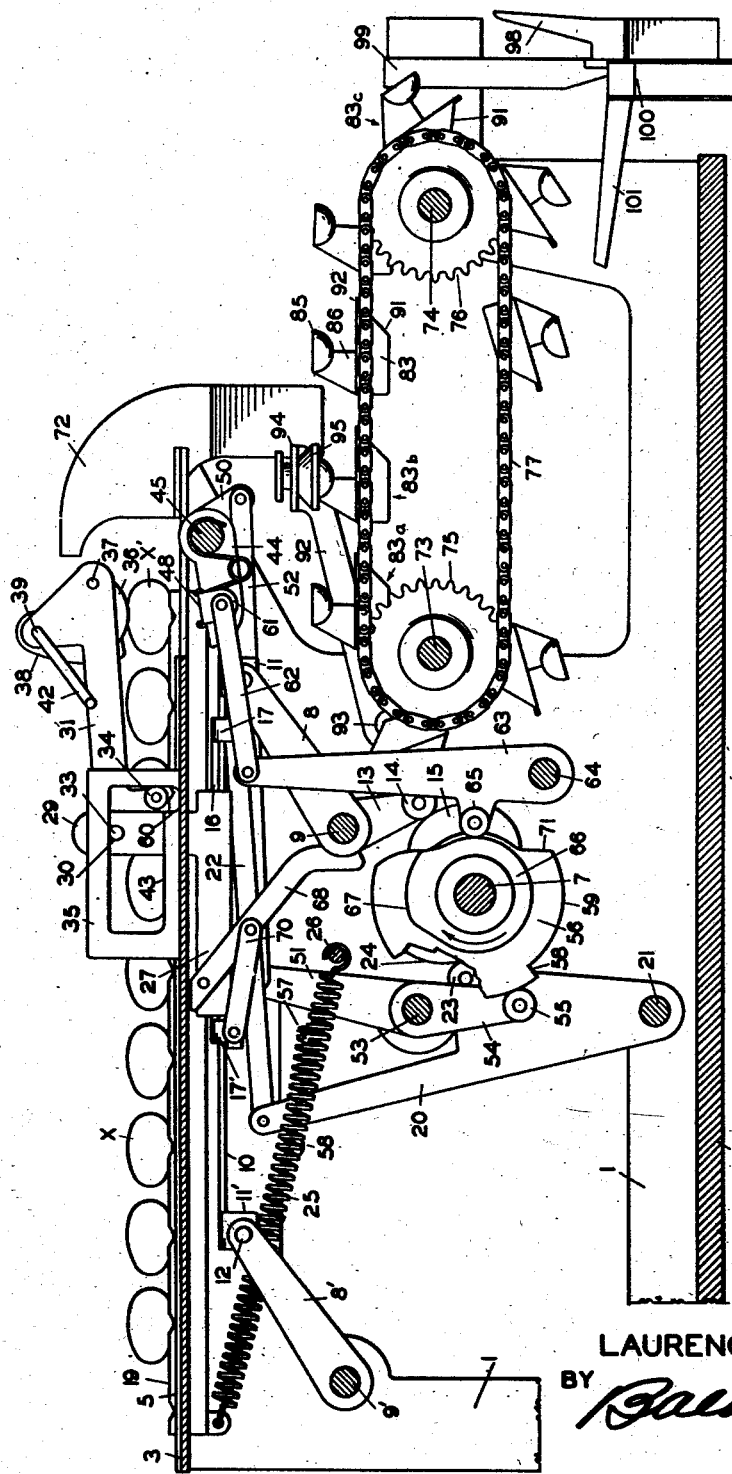
Fig. 2 is a longitudinal vertical section of the same, taken along the line II—II in Fig. 1, and showing an egg in position to undergo the cracking and opening operation.

In detail, the construction illustrated in the drawings, referring more particularly to Figs. 1 and 2, comprises the interspaced side frame members 1, 1 which are mounted on the base 2. The top plates 3, 3 are fixed on the frame members 1, 1 and extend inwardly, leaving, however, the longitudinal opening 4 therebetween. (See Fig. 1.) The plates 3, 3 have the upturned lips 5, 5 at the margins of this opening. These lips are notched at intervals, as at 6 (see also Fig. 7), to form pockets for receiving a longitudinally disposed row of eggs.

The eggs are advanced along the row of pockets 6 by the following means: The main shaft 7 is journalled in the frame members 1, 1 and has mounted thereon cams for actuating the various mechanical movements of the machine. This shaft 7 is driven by means, not shown, which may consist of an electric motor or a hand crank, as desired. The rocker arms 8—8' are fixed on the shafts 9—9' which are rotatably mounted in the frame members 1, 1. The bar 10, located beneath the openings 4, has the bent down lugs 11—11' at its opposite ends which are pivoted on the rocker arms 8—8' by means of the pins 12. The shaft 9 has the arm 13 extending downwardly therefrom with the roller 14 provided at its lower end. The cam 15 is mounted on the main shaft 7 and cooperates with the roller 14 to swing the rocker arms 8—8' and thus to raise and lower the bar 10 relative to the plates 3, 3.

The slide 16 rests on top of the bar 10 and has the bent down lugs 17—17' at either end which have inturned ears such as 18 (see Figs. 7 and 8) engaging beneath the bar 10 to retain the slide 16 in position thereon. The channel 19 is longitudinally disposed on the slide 16 and has its bottom section welded thereto. The top edges of the channel are notched at intervals corresponding with the spacing of the pockets 6 in the lips 5—5.

The lower end of the lever 20 is pivoted on the shaft 21. Its upper end is connected to the bent down lug 17 on the end of the slide 16 by means of the link 22. The roller 23 is mounted on the lever 20 and is arranged to cooperate with the cam 24 on the main shaft 7. This cam is adapted to swing the lever 20 counterclockwise and retract the slide 16 and the channel 19 thereon leftward from the position of these parts shown in Fig. 2. The spring 25 contracting between the end of the channel 19 and the cross-rod 26 urges the parts into the position which is shown in Fig. 2.

The channel 19, when raised by the operation of the cam 15, engages underneath the row of eggs and lifts them above the level of the pockets 6. The cam 24 then operates to permit the lever 20 to swing clockwise, thus allowing the spring 25 to contract and impel the channel 19 to the right, thus to carry the row of eggs one step forward toward the operative position. At the completion of this movement, the channel is lowered by the operation of the cam 15, allowing the eggs to come to rest in the several pockets 6. The cam 24 then retracts the channel 19 toward the left in readiness for another cycle of operation.

The following mechanism is employed to clamp the eggs in position for the cracking and opening operation: The channel shaped crosshead 27 is slidable beneath the bar 10 and is secured thereto by the inturned lugs 28 engaging the upper surface of the bar. The crosshead 27 is confined between the bent down lugs 17—17' of the slide 16 but is shorter than the distance therebetween so that it is capable of a limited movement relative thereto.

The standards 29—29 extend upwardly from opposite sides of the cross-head 27 above the plates 3, 3. They have the vertically disposed slots 30 near their upper end. The interspaced duplex arms 31—31 are secured together by the pins 32 (see Fig. 3) and have the lateral trunnions 33 extending through the slots 30. The arms 31 also have the rollers 34—34 on opposite sides thereof located beneath the trunnions 33. These rollers cooperate with the interior of the cut-away cam plates 35—35, fixed on the plates 3—3, to operate the clamp in the manner to be later described.

The pressure head consists of the channel shaped member 36 (see also Figs. 3 and 6) pivoted on the pin 37 between the duplex arms 31 and having arcuate lower edges to engage the eggs. The head 36 may be composed of rubber or other resilient material, but this is not essential.

The head 36 is adjustably maintained in position by the latch 38 which is fixed on the pin 39 rotatable in the arms 31—31. The latch has the series of ratchet teeth 40 therein which are engageable with the angular edge of the head 36. The spring 41 coiled about the pin 39 urges the ratchet teeth 40 into engagement with the head 36. The pin 39 has the crank shaped trip 42 (see also Fig. 1) which is engageable at one stage in the operation of the mechanism with the top of one of the cam plates 35—35. The trip 42 then releases the latch 38 from engagement with the head 36. The head 36 automatically adjusts itself to the size of the egg to be clamped as now to be described.

When the bar 10 is retracted, preparatory to feeding the row of eggs x forward one step, the arms 31 assume the position shown in Fig. 5 with the rollers 34—34 resting on the flat portion 43 of the cam plates 35—35. The trunnions 33 are held against upward movement by the ends of the slots 30. When the bar 10 is raised by the operation of the cam 15 to elevate the channel 19 into operative position for feeding the eggs, the standards 29—29, being part of the cross-head 27, are also raised. This permits the trunnions 33 to move upward in the slots 30 (observe Fig. 5). The arms 31 then pivot on the rollers 34 to lower the pressure head 36 toward the egg x' on the right hand end of the channel 19.

This movement carries the end of the trip 42 downward into engagement with the top edge of the adjacent cam plate 35. The latch 38 is thus swung away from the pressure head 36. The head being now free to move independently of the arms 31, moves downward by gravity until it rests on top of the egg x'. The final portion of the downward movement of the arms 31 is then accomplished without altering the pressure of the head 36 against the egg x'.

When the channel 19 is moved longitudinally to the right by the operation of the cam 24, as previously described, the crosshead 27 is forced to accompany this movement by reason of the engagement of the lug 17' therewith. The pressure head 36 thus remains in engagement with the egg x' while it is moved laterally by the channel 19. When the end of the trip 42 passes beyond the end of the cam plate 35, the spring 41 snaps the ratchet toothed latch 38 into engagement with the edge of the head 36. The head is thus now locked in operative position. At the conclusion of the lateral movement of the feeding and clamping assembly, the rollers 34 engage the sides of the cam plates as shown in Fig. 2. This prevents upward movement of the arms 31 under stresses incidental to the impaling and opening operation now to be described.

The means for impaling and then opening the egg x' are as follows: The interspaced levers 44—44 (see also Fig. 9) are fixed on the cross-shaft 45 which is rotatable in the frame members 1—1. The levers have the flanges 46—46 extending toward each other but spaced apart a sufficient distance to clear the channel 19. The pointed prongs 47—47 project upward from the flanges 46 (see also Fig. 6) and are adapted to puncture and enter the egg shell. The slide 48 extends laterally across the levers 44—44 and is slidable longitudinally with respect thereto. It is normally urged into a position abutting the prongs 47 by the coiled spring 46' expanding thereagainst (see also Fig. 4). It has the upstanding prongs 49—49, similar to the prongs 47—47, arranged in alignment therewith.

The shaft 45 has the arm 50 extending therefrom which is connected to the lever 51 by means of the link 52. The lever 51 is fixed on the shaft 53 which pivots in the frame members 1—1. The arm 54, fixed on the shaft 53, has the roller 55 thereon which is arranged to cooperate with the cam 56 on the main shaft 7. The spring 57 contracting between the lever 51 and the lug 58 on the side frame 1 (see Fig. 2) urges the levers 44 upward into operative position.

The egg impaling and opening means are brought into operation while the channel 19 is in the process of being lowered from its operative position by the cam 15. As the lowering of the channel 19 and its associated mechanism progresses, the rollers 34—34 descend into the depressions 60 in the cam plates 35, as shown in Fig. 3, leaving, however, the pressure head 36 still in engagement with the egg $x'$. When the abrupt drop 58 on the cam 56 passes the roller 55, the spring 57 is allowed to snap the levers 44—44 upward causing the abutting prongs 47—49, 47—49 to pierce and enter the egg shell $x'$ as is shown in Fig. 3. The entry of the prongs initiates a crack around the egg. After the levers 44 have been swung into operative position as described, the roller 55 rides on the concentric arcuate portion 59 of the cam 56, thus holding the egg $x'$ clamped between the levers 44 and the pressure head 36.

The initial portion of the movement of the channel 19 toward the left is accomplished without affecting the clamping means. As indicated in Fig. 2, there is a space between the crosshead 27 and the lug 17 of the slide 16. This space permits a limited movement of the slide 16 to the left when operated by the cam 15, without an accompanying movement of the crosshead 27. The crosshead is frictionally held against movement during this phase of the operation by the rollers 34 engaging against the side of the depressions 60. The result of this combination of operations is that the egg $x'$ remains clamped while the end of the channel 19 is sufficiently retracted to clear the descending egg contents when the shell is pried open.

The opening of the eggshell $x'$ is accomplished as follows: The slide 48 has the bent down lugs 61 at its ends which are connected by the links 62—62 to duplex levers 63 on opposite sides of the machine. These levers are fixed on the shaft 64 which pivots in the frame members 1—1. One of these levers has the roller 65 thereon which coacts with the cam 66 on the main shaft 7. When the channel 19 is retracted as above described, the rise 67 on the cam 66 displaces the roller 65 and the levers 63 and forces the slide 48 and the prongs 49 thereon away from the prongs 47 into the position shown in Figs. 4 and 9. This pries the egg open along the crack previously initiated by the penetration of the several prongs 47—49. The egg contents fall through the space between the lever flanges 46 and the slide 48 into a separatory pan to be later described.

At the completion of the egg opening operation, the arms 31 are raised to release the egg as now to be described; The crosshead 27 has the depending dog 68 pivoted thereto at 69. The link 70 connects the dog 68 to the lug 17' on the end of the slide 16. When the slide 16 moves relative to the crosshead 27 as earlier described, the dog 68, by reason of its connection to the lug 17' is swung to the left on its temporarily stationary pivot 69. Just before the egg opening operation, the dog 68 moves into contact with the cross rod 26 as shown in Fig. 3. After the completion of the egg opening operation, the continued movement of the slide 16 and its lug 17' causes the dog 68 to pivot against the rod 26 as shown in Fig. 5, thus driving the crosshead 27 to the left relative to the slide 16. The consequent movement of the rollers 34 out of the depression 60 on to the flat portions 43 of the cam plates raises the arms 31 into the position shown in Fig. 5, thus releasing the egg shell.

The empty egg shell may now be ejected. The drop 71 in the cam 56 (see Figs. 2 and 3) upon passing the roller 55, allows the lever 51 to swing counterclockwise under the tension of the spring 57. The levers 44 are thus snapped into the position shown in Fig. 5. The momentum imparted to the empty egg shell by this movement carries it into the chute 72 mounted on the plates 3, 3 and discharging at the side of the machine. The subsequent operation of the cam 56 restores the levers 44 to their initial position shown in Fig. 1. The separatory pans hereinbefore referred to for receiving the egg contents are mounted on a conveyor system now to be described. The shafts 73 and 74 are rotatably mounted in the frame members 1, 1 and each has fixed thereon a pair of interspaced sprockets 75—75 and 76—76. The chains 77—77 (see also Fig. 1) encircle these sprockets.

These conveyor chains 77—77 are intermittently driven in timed relation to the dumping of the egg contents. The ratchet wheel 78 is fixed on the end of the shaft 74, see Figs. 1 and 11. The lever 78' is pivotally mounted upon this shaft and has the pawl 79 pivoted on its upper end and adapted to coact with the ratchet wheel 78. The spring 80 urges the pawl 79 into operative engagement with the ratchet 78. The lever 78' is harmonically oscillated by the link 81 (see also Fig. 10) engaging the cam 82 which is fixed on the end of the main shaft 7. This driving mechanism is arranged so that the pawl 79 is advanced against one of the teeth of the ratchet 78 and the conveyor chains 77—77 are driven during the idle cycle of operation of the egg opening means. Suitable means may be employed to prevent backward movement of the ratchet 78 during the inoperative movement of the pawl 79.

The egg separatory pans 83, one of which is shown in section in Fig. 4, have the standards 86 extending upwardly therefrom with the yolk cups 85 fixed thereon. The chains 77—77 are connected together by a series of interspaced struts 87, 88. The pans 83 have the bent over flanges 89 which are arranged to rest on the struts 87. The tongues 90, at the bottom of the flanges 89, are bent back toward the pans 83 to restrict, but not close, the entrance into the spaces between the flanges 89 and the pans 83. The top edges of the struts 87 are bent slightly backward, as best shown in Fig. 3. The side edges of the flanges 89 have the detents 89' struck inwardly to engage frictionally the bent edges of the struts 87. This arrangement insures against the pans 83 dropping off when they pass beneath the conveyor chains 77 as shown in Fig. 3. The forward end of the pans 83 are inclined upward at 91 for convenience in discharging the egg whites and have the lips 92 extending therefrom. These lips rest on top of the struts 88 to support this end of the pans.

During the egg opening operation, previously described, one of the pans 83 is located immediately beneath the prongs 47, 49 at 83$a$. In the dumping of the egg contents, the yolk $y$ first falls on account of the albuminous white being retarded by its adhesion to the egg shell membrane. The yolk $y$ consequently falls into the cup 85 with the trailing egg white sliding thereoff down into the egg pan 83. Since the size of the egg cup 85 is such that it is completely filled by the yolk $y$, practically all of the white must spill over into the pan 83.

After the pan has had the contents of an egg dumped thereinto as above described, it is moved into the position 83$b$, see Fig. 2. At this point the residual egg white adhering to the yolk is severed therefrom. The lever 92 is fixed on the shaft 93 which is mounted in the adjacent side plate 1. The lever 92 has the bent-over end 94 with the conical cutter 95 loosely supported therein, see also Fig. 10. This cutter is adapted to engage around the relatively sharp edges of the yolk cup 85 to sever the egg white trailing downwardly therefrom. The loose mounting of the cutter at 94 enables it to align itself automatically with the edge of the yolk cup. The cutter 95 is lowered into operative position by the operation of the cam 82, which cooperates with the roller 96 on the lever 97 fixed on the shaft 93. The cutter 95 is again raised from its operative position before the chain 77—77 makes its periodic movement.

After the pans move seriatim from the position 83b, they pass into a region where they are accessible to the operator. The operator observes the condition of the eggs when they are dumped into the pan 83. Should one of the eggs be spoiled or musty, the pan containing the same can be manually removed from the conveyor chains 77 by simply removing the pan 83 from its supporting struts 87, 88. Another pan may then be inserted in the place and the pan containing the spoiled eggs cleaned and sterilized before being placed in use again. The substitution of the pan may be accomplished without halting the operation of the machine.

As each of the pans pass around the sprocket 76, they are swung into the position 83c. The yolk in the cup 85 is then flipped into the inclined chute 98 which is supported on the bracket 99. The egg white pours out of the inclined end 91 into the chute 100, which is similarly supported by the bracket 99 and discharges on the opposite side of the machine. The chute 100 has the extension 101 to receive the final drippings of egg white from the pan 83.

Having thus described this invention, what is claimed and desired to be secured by Letters Patent is:

1. In a machine of the class described; a pair of fixed interspaced plates having depressions in their opposed edges arranged to form egg pockets; egg opening means located at one end of the space between said plates; a feed member longitudinally disposed in the space between said plates but normally occupying a position beneath the level of said plates and notched at intervals corresponding to the spacing of said egg pockets; means for raising said feed member to elevate the eggs in said pockets above the level of said plates; means for moving said feed member laterally toward said egg opening means; and means for lowering said feed member to deposit the eggs thereon into said pockets.

2. In a machine of the class described; means for supporting an egg; an arm movable with respect to said egg; a pressure head movably mounted on said arm and adapted to engage said egg; a latch on said arm arranged to lock said head in any of a plurality of positions relative to said arm; means for moving said arm so as to bring said head into engagement with said egg; a trip arranged to release said latch from said head when said head is moved toward said egg; and means for re-engaging said latch after said head engages said egg.

3. In a machine of the class described; means for supporting an egg; an arm movable with respect to said egg; a pressure head pivoted on said arm and adapted to engage said egg; a latch on said arm having ratchet teeth therein arranged to engage and lock said head against movement on its pivot; a trip adapted to swing said latch out of said engagement with said head; a stationary cam arranged to operate said trip when said head is moved toward said egg; and means for laterally moving said egg supporting means, said arm, and pressure head synchronously; said trip moving out of engagement with said stationary cam and permitting re-engagement of said latch with said head during this lateral movement.

4. In a machine of the class described; a pair of interspaced levers mounted on a common shaft; a prong on each of said levers; a slide traversing said levers and slidable with respect thereto; prongs on said slide arranged to align normally with the prongs on said levers; means for feeding an egg into a position above said levers; means for swinging said levers upward to enter said aligned prongs into said egg; and means for moving said slide to retract the prongs thereon away from the prongs on said levers after the egg is impaled thereon, whereby said egg is opened.

5. In a machine of the class described, including a conveyor; a lever beneath said conveyor and having a prong thereon; a slide on said lever having a prong thereon; a pressure head above said conveyor; and means for synchronously moving said slide, releasing said pressure head, and elevating an end of said lever above said conveyor.

6. In a machine of the class described, an egg conveyor; a pressure head automatically adjustable to the size of an egg on said conveyor; a lever transversely pivoted below the level of said conveyor; egg shell severing means on said lever; and means for synchronously releasing said pressure head and swinging said lever on said pivot in alignment with said conveyor; whereby said egg shell is ejected in line with the travel of said conveyor.

7. In a machine of the class described, an egg conveyor; pressure means synchronized with the travel of said conveyor; a pressure head pivoted on said means and automatically adjustable to the size of an egg on said conveyor; means for locking said head in adjusted position; means adapted to open the shell of said egg from below and eject said shell in line with the travel of said conveyor synchronously with the release of said pressure head.

8. In a machine of the class described, an intermittent egg conveyor; a cross head movable substantially parallel and in synchronism with said conveyor; a cam plate fixed on the frame of the machine; an arm pivotal on said cross head and engaging said cam plate and adapted to rise and fall with the reciprocal movement of said conveyor; a pressure head pivoted on said arm; a lock engageable with said head and controlled by said cam plate, whereby the pressure of said pressure head is automatically determined by the size of an egg on said conveyor; and means for opening and separating said egg.

9. In a machine of the class described, movable means for supporting an egg; a lever positioned beneath said egg; relatively movable prongs carried by said lever; mechanism for moving said lever upwardly to cause said prongs to enter the egg; means for moving said supporting means out of contact with the egg, whereby it is wholly supported by said prongs; means for separating said prongs to open the egg supported thereby; and said mechanism being arranged to continue the upward movement of said lever after the egg is opened to eject the shell in an upward direction.

10. In a machine of the class described, means for supporting an egg; prong members positioned beneath said egg, said members being movable vertically in unison and horizontally in opposition; mechanism connected with said members to impart initial upward movement thereto to cause their prongs to enter the egg, said mechanism imparting subsequent abrupt upward movement to said members to eject the egg shell in an upward direction; and means connected with said members for separating them horizontally in the time interval between their initial and subsequent upward movements, to cause their prongs to open the egg.

11. In a machine of the class described, means for opening an egg; a pair of laterally spaced conveyor chains; a pair of transverse struts connected with and extending between said chains; a receptacle carried by said struts for receiving the contents of the egg, said receptacle comprising a pan for receiving the white of the egg and a cup for receiving the yolk, said cup being held in fixed relation to and above said pan; flanges extending from the ends of said pan and positioned to engage said struts to support the receptacle removably thereon, and one of said flanges being hook shaped to enable it to partially surround the strut upon which it rests.

LAURENCE M. SIGLER.